United States Patent [19]

Morris

[11] Patent Number: 4,906,038
[45] Date of Patent: Mar. 6, 1990

[54] LIVESTOCK ENCLOSURE FOR A PICKUP TRUCK OR THE LIKE

[76] Inventor: Gerald T. Morris, Box 2199, Meeker, Colo. 81641

[21] Appl. No.: 226,293

[22] Filed: Jul. 29, 1988

[51] Int. Cl.$^4$ ................................................ B60P 3/04
[52] U.S. Cl. ........................................ 296/14; 296/3; 296/36; 160/84.1
[58] Field of Search ............... 296/3, 12, 7, 13, 14, 296/32, 36, 24.2, 27; 160/84.1, 84.2, 84.3

[56] References Cited

U.S. PATENT DOCUMENTS

| | | | |
|---|---|---|---|
| 2,899,235 | 8/1959 | Curtis et al. | 296/27 |
| 3,148,912 | 9/1964 | Curtis et al. | 296/3 |
| 3,600,032 | 8/1971 | Gross | 296/13 |
| 4,398,763 | 8/1983 | Louw | 296/3 |
| 4,405,170 | 9/1983 | Raya | 296/3 X |
| 4,416,482 | 11/1983 | Patterson | 296/3 |
| 4,547,014 | 10/1985 | Wicker | 160/84.1 X |
| 4,611,824 | 9/1986 | McIntosh | 296/3 X |

FOREIGN PATENT DOCUMENTS 0626079  8/1961  Canada ................................. 296/3

Primary Examiner—Margaret A. Focarino
Assistant Examiner—Gary C. Hoge
Attorney, Agent, or Firm—Wm. Griffith Edwards

[57] ABSTRACT

A livestock enclosure for a pickup truck or the like comprises two foldable rack structures, one for each side wall of the truck body, the structures terminating at the rear of the truck. The racks are collapsible against a vertical head board at the front of the truck body. Locking pins are provided to secure the rack to the wall of the truck. The rear gates may be swung open and if the truck is too close to a cattle chute or other structure, the gates may be opened by lateral movement. A locking bar holds the rack structure in position at the rear of the truck and also is employed to retain the rack in its collapsed position against the cab.

3 Claims, 12 Drawing Sheets

LIVESTOCK ENCLOSURE FOR A PICKUP TRUCK OR THE LIKE

This invention relates to a pickup trucks or the like and particularly to structural components for making conventional vehicles useful for additional purposes. The invention relates particularly to an improved livestock enclosure for pickup trucks which can be stored in a truck in collapsed configuration and may quickly and easily be positioned for use in the transportation of livestock.

BACKGROUND OF THE INVENTION

Various modifications and structural features have been proposed heretofore the purpose of increasing the field of utility of pickup trucks and the like. By way of example, U.S. Pat. No. 3,460,864 Piercy discloses a collapsible truck rack which may be applied to pickup trucks, and U.S. Pat. No. 2,808,291, Van Meter discloses a detachable body of the rack type for pickup trucks and the like. U.S. Pat. No. 2,899,235 Curtis et al discloses a collapsible wall arrangement for vehicles in which solid panel walls are arranged to be collapsed in accordion fashion and stored in the vehicle when they are not required for use.

It is an object of this invention to provide an improved collapsible livestock enclosure for pickup trucks and the like.

It is a further object of this invention to provide an improved livestock enclosure for pickup trucks and the like which can readily be moved from a collapsed storage position into its position for use. It is a further object of this invention to provide an improved livestock enclosure for pickups and the like which, when collapsed, does not interfere with the use of the body of the truck and which can be readily and easily installed for use.

It is a further object of this invention to provide a livestock enclosure for pickup trucks and the like which may readily be collapsed and stored when not in use, and further, which is provided with rear gates which may be swung to open them or may be moved laterally so that they may be opened even if the truck is very close to structures such as cattle chutes.

SUMMARY OF DISCLOSURE

A rack structure is provided which is mounted on the truck body and extends from the vertical posts at the front on which the rack structures are hinged and extends back along the side walls of the truck to the rear wall where it is provided with gates which swing towards the center when closed and constitute extensions of the tailgate of the truck. In order to secure the rack structures to the body of the truck, longitudinal structural members are provided and are attached to and extend along the top walls of the truck body to the rear wall. These members are angle irons having one side on the inside of the truck wall and the other side on the top and forming the base for the mounting of the structural racks. The gates at the rear may be swung open and closed or in the event that the truck is backed up to a position close to a cattle chute or the like, the gates are arranged so that they may be moved laterally even when within only a few inches of the stationary structure. The rack structures may be collapsed in the manner of an accordion and are stored behing the truck cab and out by the way of the truck body.

DETAILED DESCRIPTION

Figure 1:
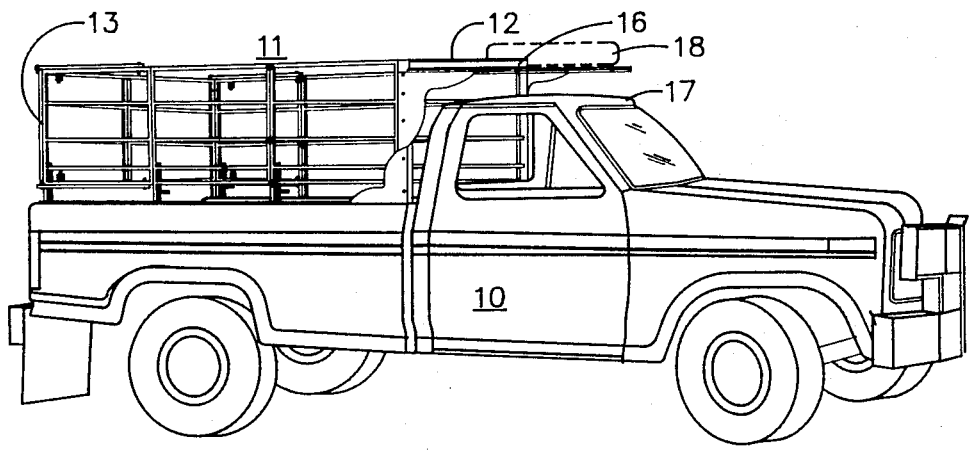
FIG. 1 is a somewhat diagrammatic perspective view of a pickup truck provided with a livestock enclosure embodying the invention.
Figure 2:
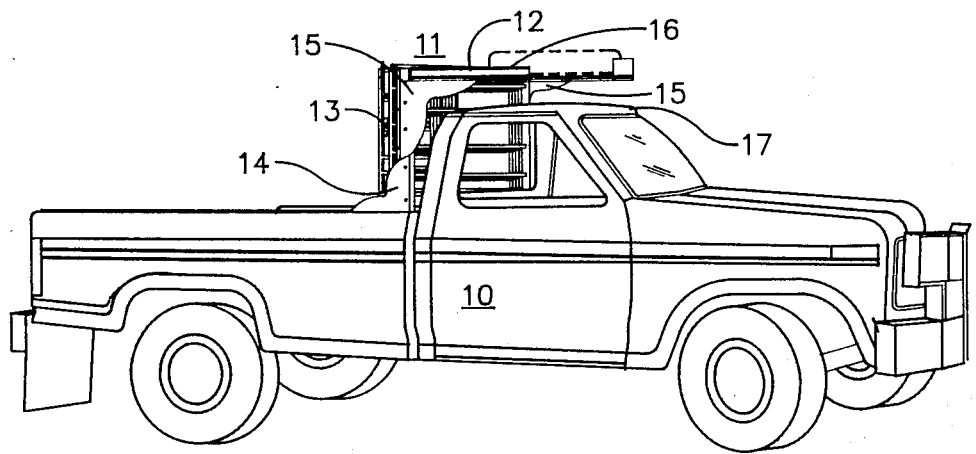
FIG. 2 is a view similar to FIG. 1 showing the rack in its closed or collapsed position.

FIG. 1 illustrates a pickup truck 10, in which a livestock enclosure 11, embodying the invention has been installed. The enclosure includes a vertical head structure 12, and a rack assembly generally indicated at 13, which comprises longitudinal racks on the two sides and a rear rack extending across the back of the vehicle. When the rack structure is not required for use, it may be collapsed in the manner of an accordion and secured against the vertical wall 12, as indicated in FIG. 2. As shown in FIGS. 1 and 2, the head structure 12 is mounted in a vertical position just behind the cab of the truck. The structure is reinforced by gussets 14 and 15, which increase the rigidity of the platform, indicated at 16, at the top of the structure. The structure is sufficiently high to be spaced from the top of the cab indicated at 17, and is provided to carry a spare tire such as indicated at 18 in dotted lines, and other tools or accessories may be stored there. As shown in the plan view, FIG. 3, a spare wheel may be mounted in the center portion of the platform.

Figure 3:
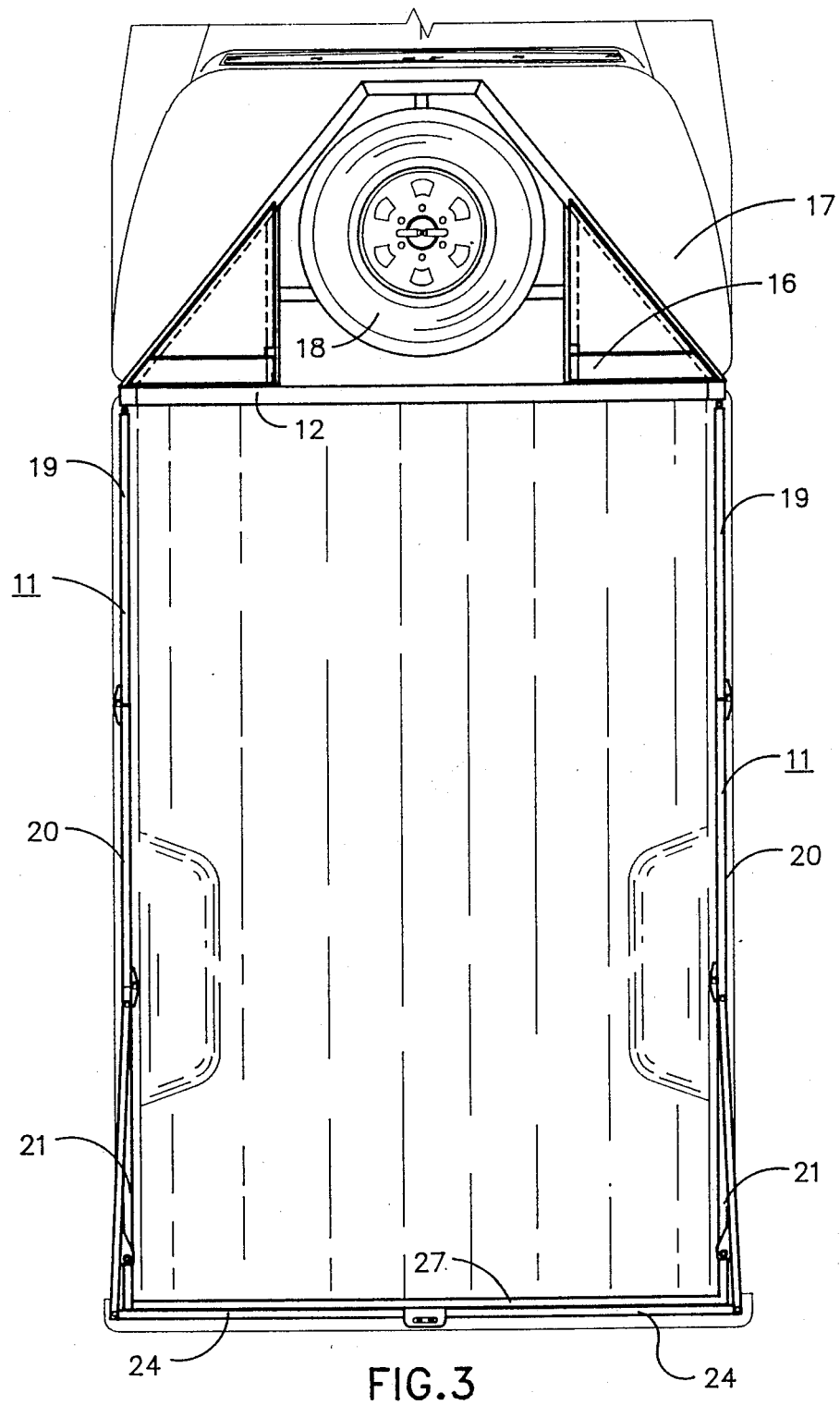
FIG. 3 is a plan view of the pickup truck showing in FIG. 1 with the enclosure in position for use.
Figure 4:
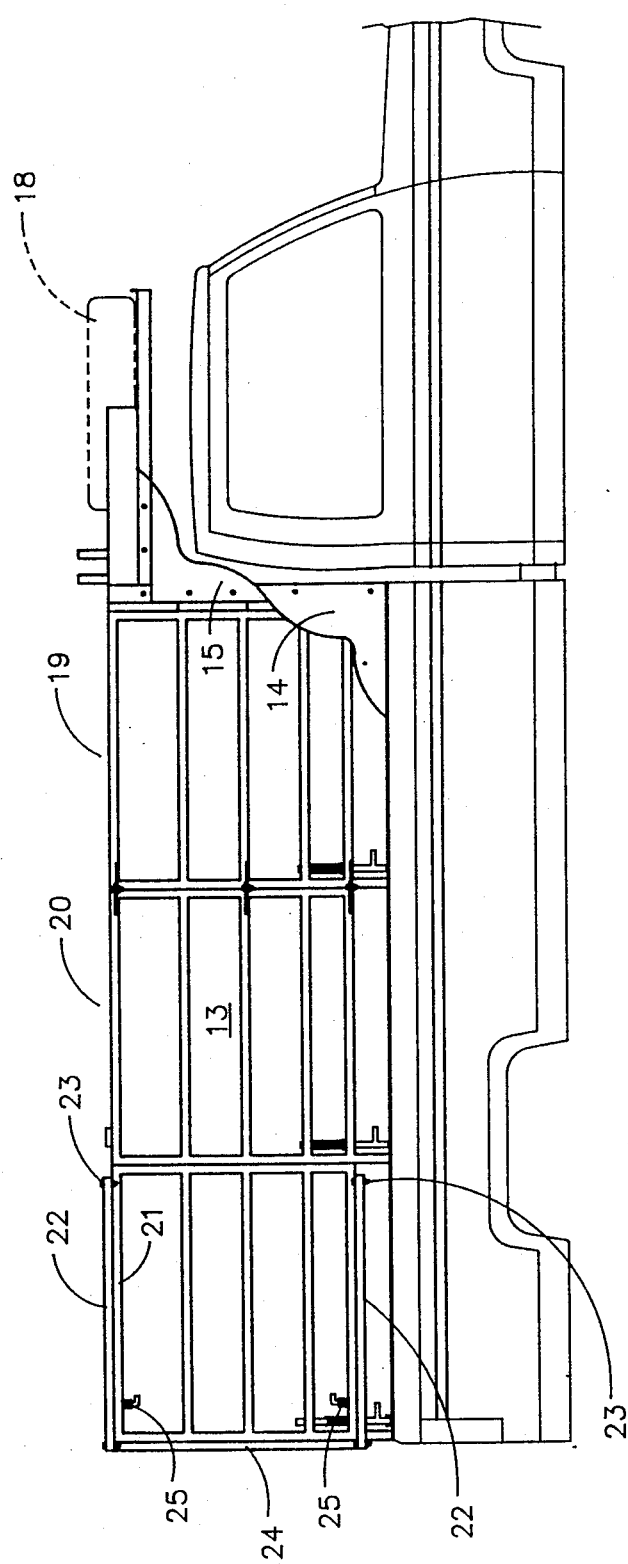
FIG. 4 is an enlarged side elevation view of the truck of FIG. 1.
Figure 5:
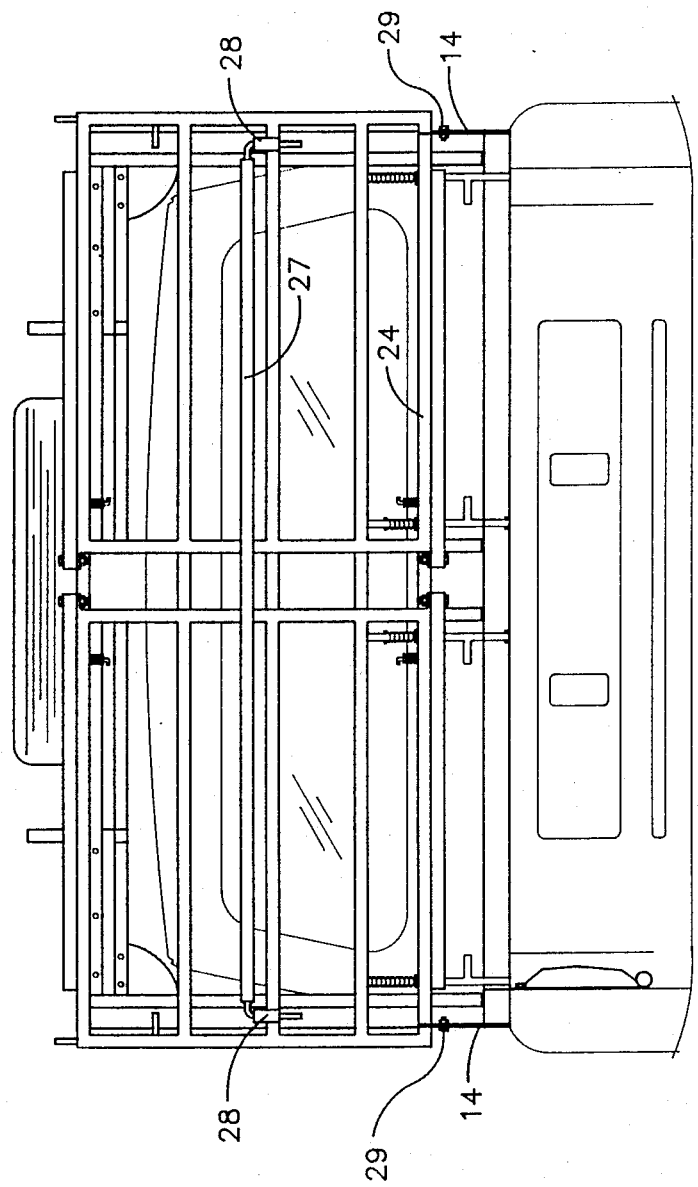
FIG. 5 is a rear elevation view of the truck as shown in FIG. 2.
Figure 6:
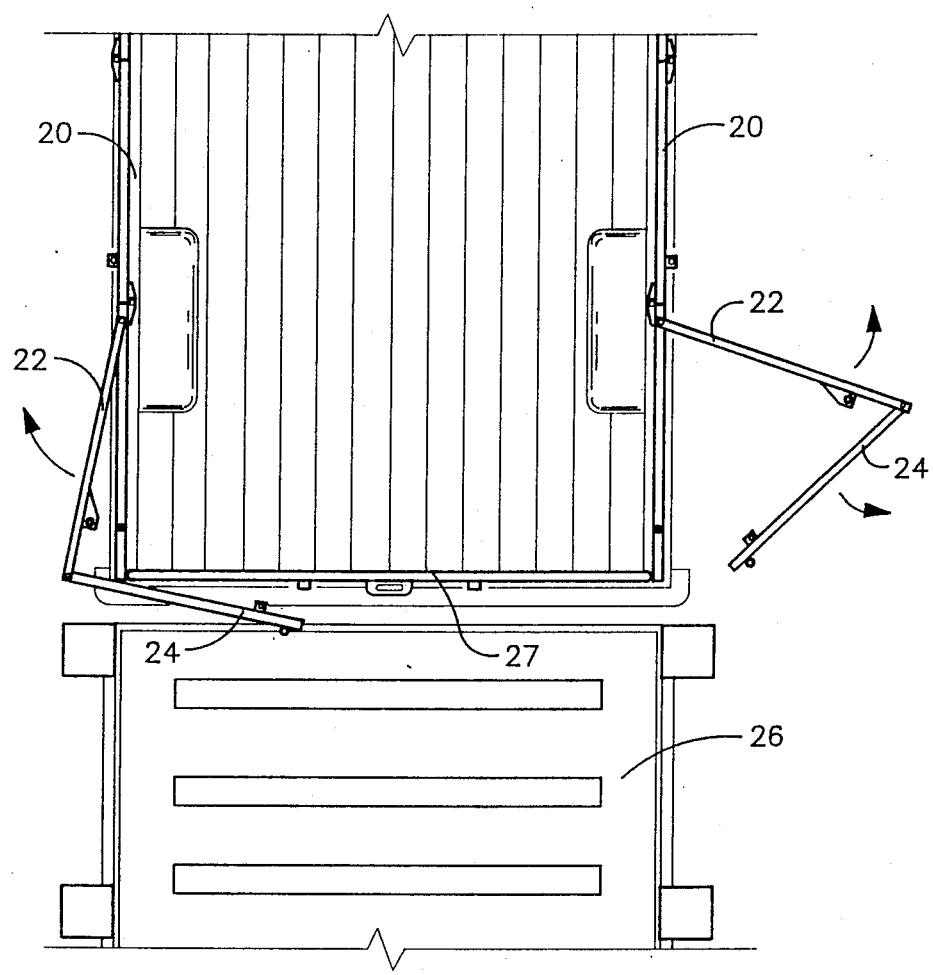
FIG. 6 is a plan view of a portion of the truck of FIG. 1 shown with the rear gate partially open.
Figure 7:
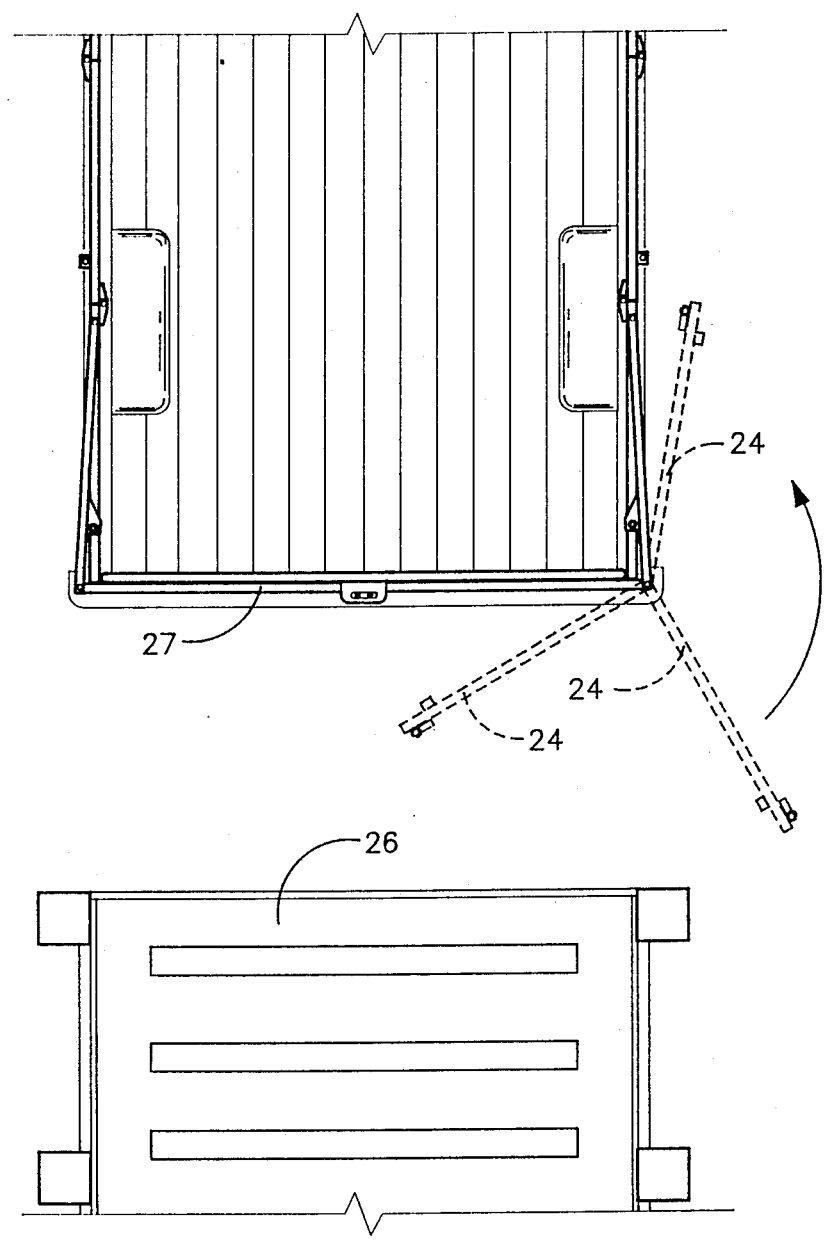
FIG. 7 is a view similar to FIG. 6 shown when the gate is closed and in dotted lines the right hand gate in three different open positions.
Figure 8:
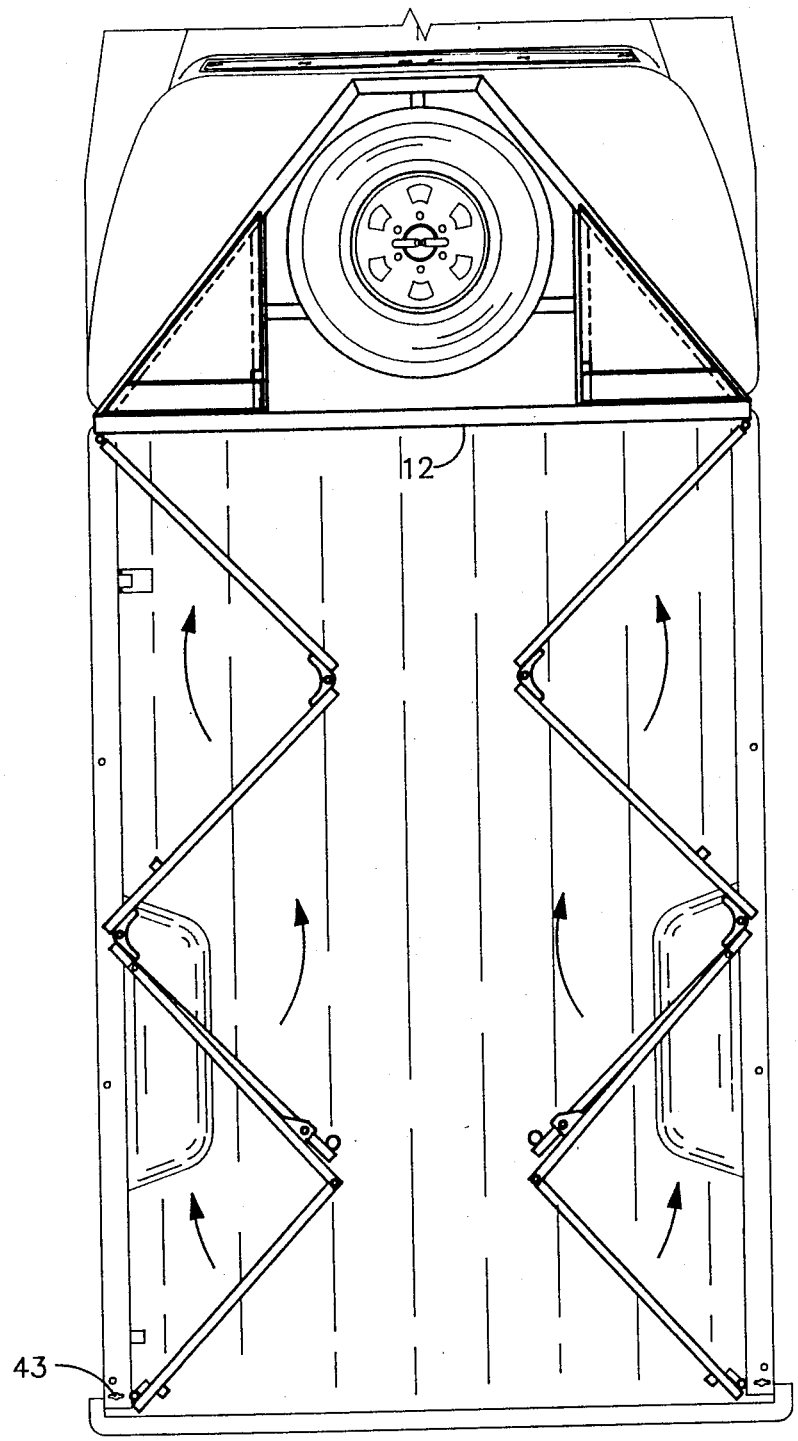
FIG. 8 is a view similar to FIG. 3 showing the rack sections in open partially extended positions.
Figure 9:
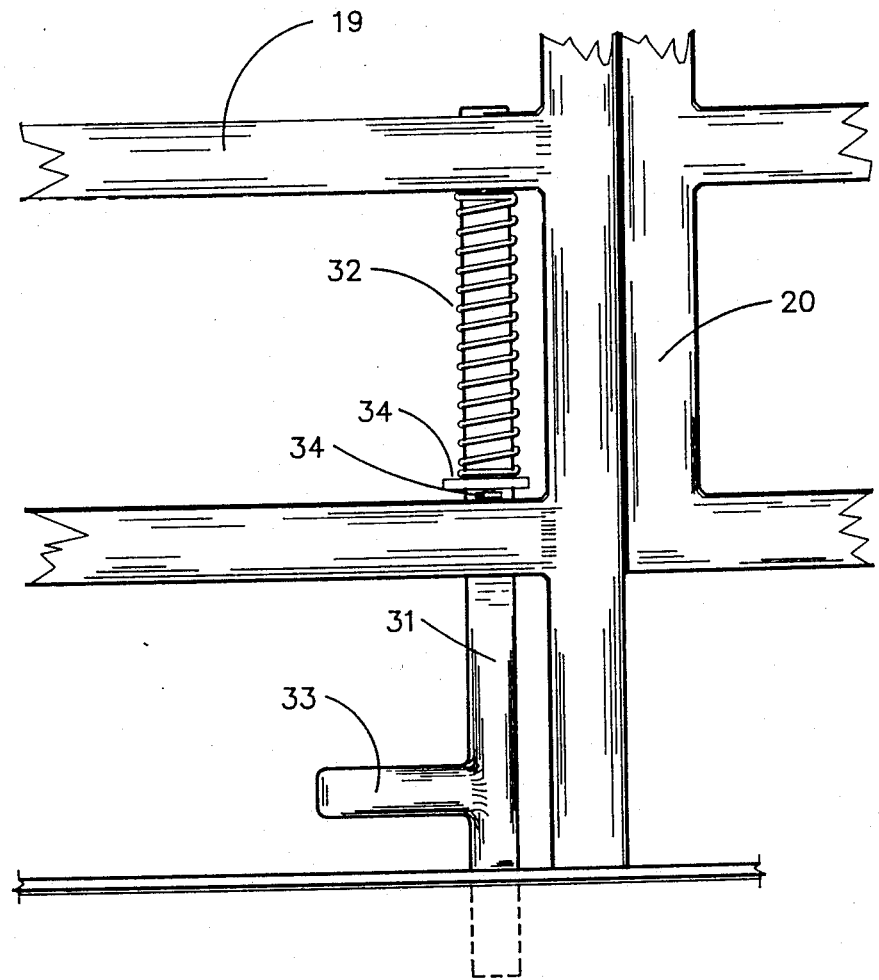
FIG. 9 is an enlarged partial view showing one of the rack locating and securing pins.

As shown in FIGS. 3 and 4, the rack structure comprises a rack structure or assembly, comprising 3 sections, 19, 20 and 21 which are hinged together and extend the length of the truck body. As shown in FIG. 3 and 4, each of the rack structures comprises 3 rack sections, 19, 20, and 21 which are mounted in alignment along the two sides of the truck body. The end of the structure comprises the two sections which are the rear gates of the assembly and are pivotally mounted on sections 21,to which they are secured through longitudinal members 22, at the top and the bottom of the gates, respectively. Members 22 are secured in general alignment with the top and bottom bars of the section or frame 21 and for this purpose are pivoted on hinges 23, to the section 21, near the hinges between the sections 20 and 21. The gates indicated at 24 are hinged to the longitudinal 22, and are retained in their position of general alignment with the rack section 21 by spring biased latches 25. When these latches are connected, the gates are, in effect, hinged directly on the rack sections 21, and are opened and closed by swinging action toward the rear of the truck. When the truck is close to a cattle chute or other obstruction, gates 24 may be moved laterally about the hinges 23, so that they swing out on the arms 22. With the gates pivoted in this manner, they may be moved out laterally when the truck is as close as several inches from the loading chute or other obstacle. The normal swinging action of the gates is indicated in FIG. 7, which shows the gate 24 swinging about its normal pivot; three positions being indicated in dotted lines. This shows the normal swinging action of the gates and is such that the gates will clear the cattle chute or other object indicated generally at 26. When the enclosure is not to be used, the several sections may be folded together in the manner of an accordion. For this purpose, a cross bar, indicated at 27, and which is connected at its ends to rearward sections 21 is removed and the sections are moved toward the cab and go through a position such as indicated in FIG. 8 and from this position can be moved straight forward and will lie against the vertical wall 12, whereupon the bar 27 is placed in the position shown in FIG. 5 and the assembly pressed forward until the downwardly turned ends of the bar can be inserted and lie in sockets 28 and the bottom of the gate section 24 engages and is held by a pivoted latch located at 29 on the gusset 14. The bar 27, thus serves two purposes; holding the gate assembly in its position for use and also in its collapsed storage position.

Figure 10:
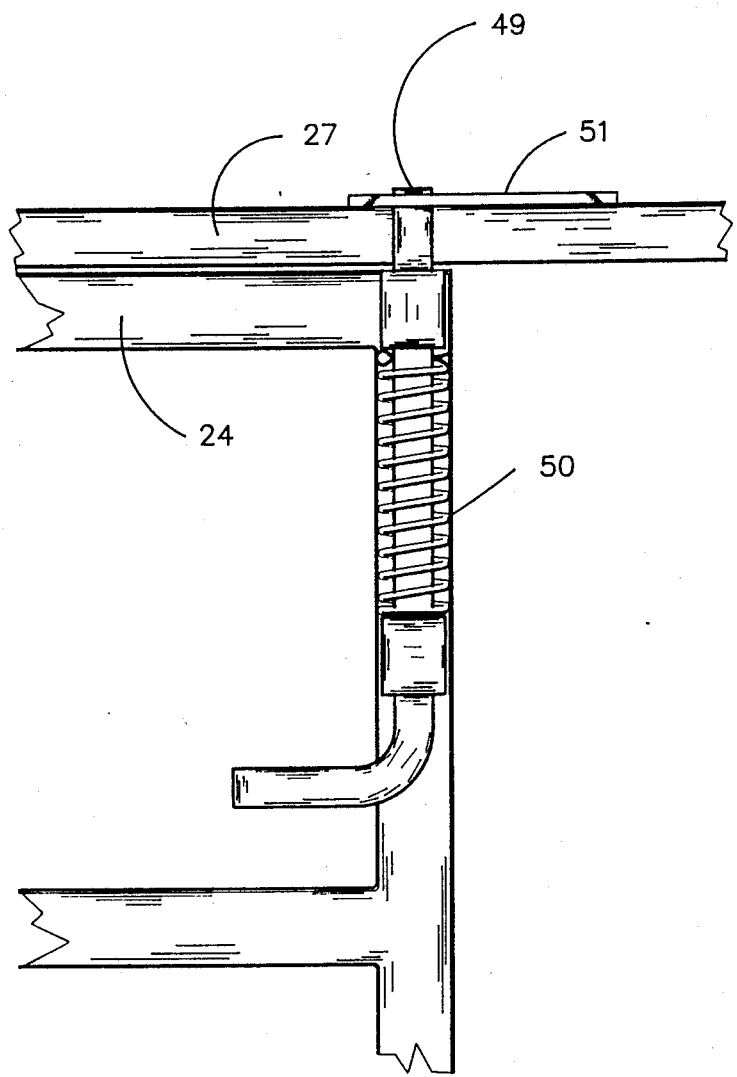
FIG. 10 is an enlarged view similar to FIG. 9 showing one of the latching pins of the enclosure.
Figure 11:
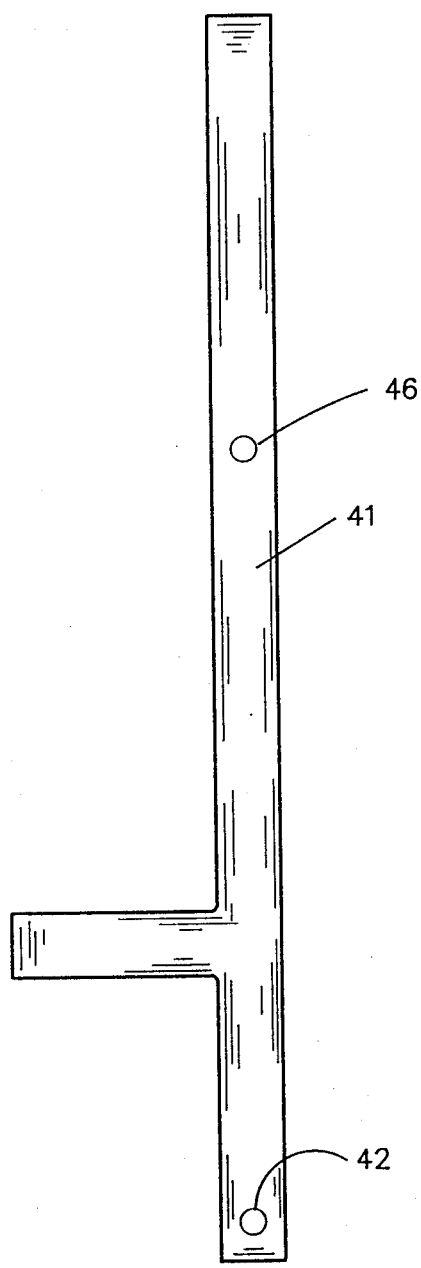
FIGS. 11 and 12 are enlarged views similar to FIG. 9 showing two of the locating pins.
Figure 12:
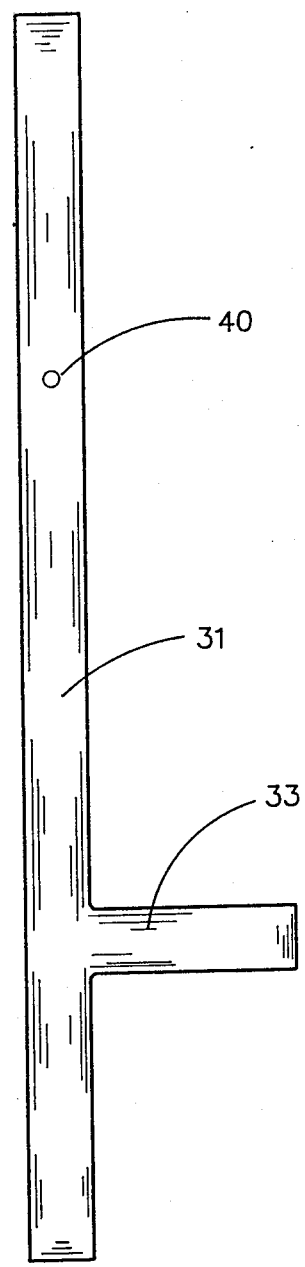
Figure 13:
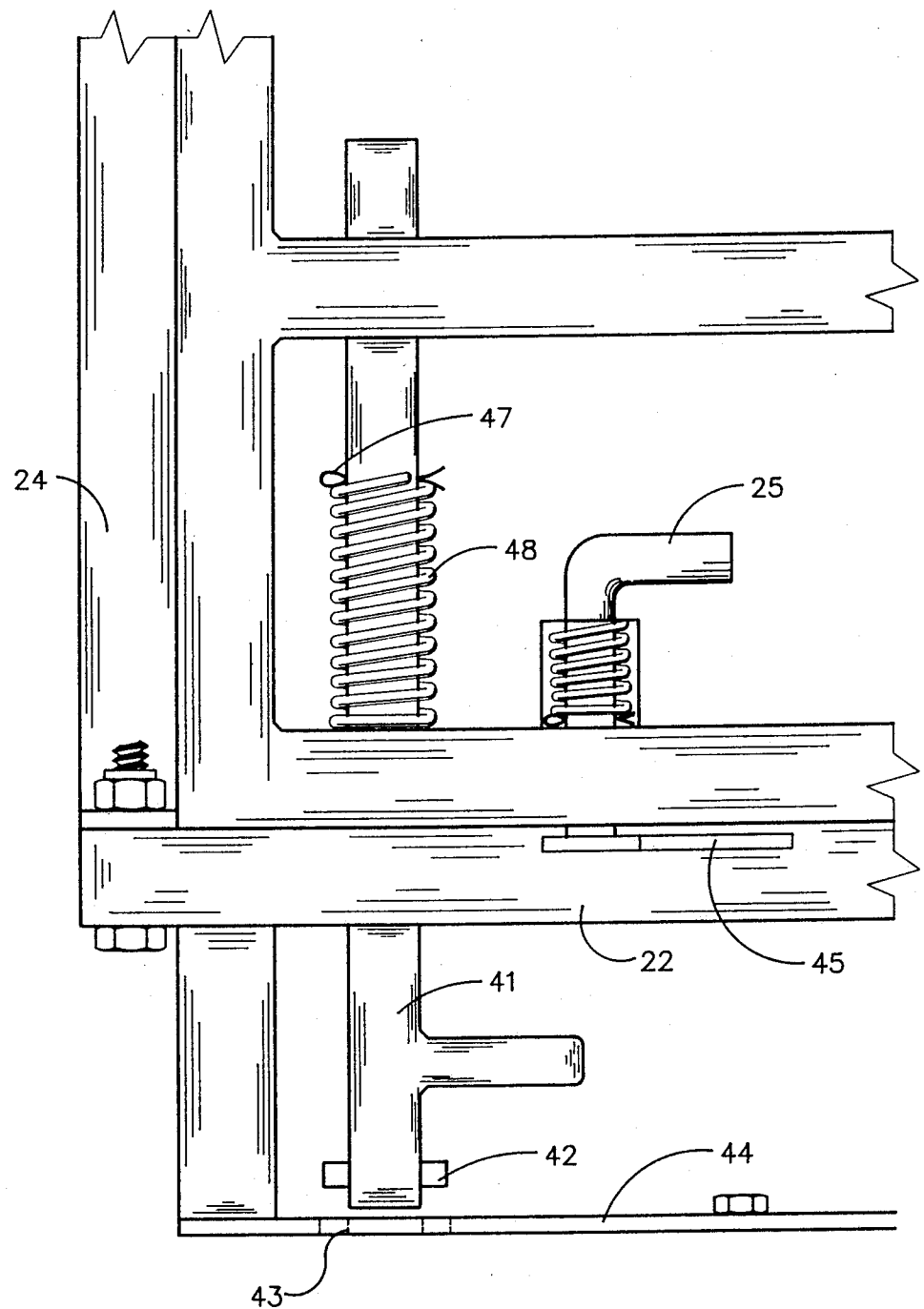
FIG. 13 is an enlarged detailed view of a locating pin and latch which appear at the far left hand lower corner in FIG. 4.
Figure 14:
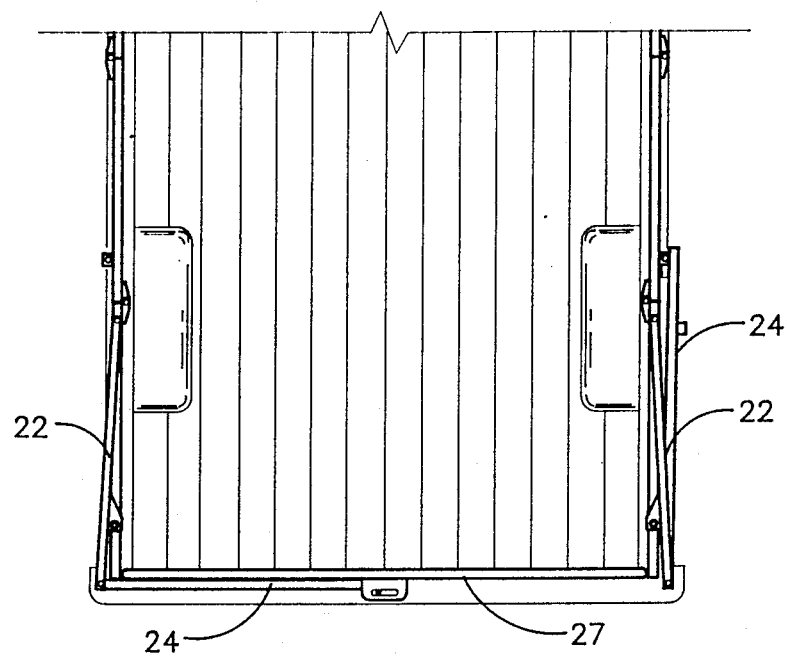
FIG. 14 is a plan view of the truck showing one gate closed and the other swung to its extreme position against the outside of the adjacent section.
Figure 14:
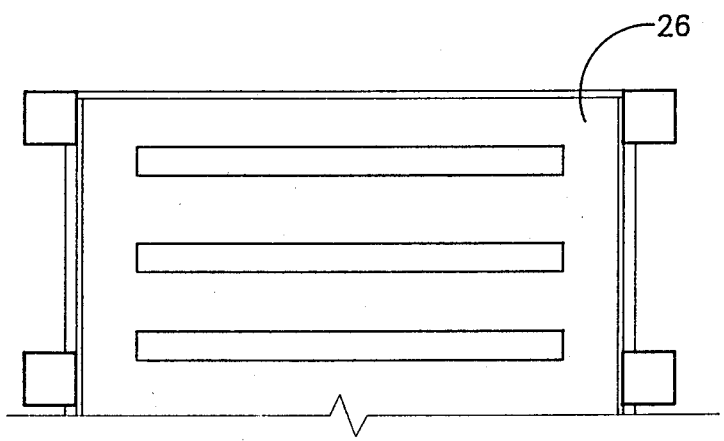

In reference to FIGS. 9, 10, 11, 12, and 13, it will be noted that these show enlarged views of the latching mechanisms used in the several locations on the livestock enclosure. The latching mechanism shown in FIG. 9, comprises a bolt or plunger 31, biased downwardly by a spring 32. The plunger 31 is provided with a projecting bar 33 for the purpose of manipulation, and the pressure of the spring is exerted between the upper bar of the rack 19, and washer 34, secured in place by a cotter pin or the like, indicated at 35. FIG. 12 is an enlarged view of the plunger 31 and shows the hole 40 through which the cotter pin is inserted to hold the washer 34. FIG. 11 is a view similar to FIG. 12 showing the plunger for the mechanism illustrated in FIG. 13. This plunger indicated at 41 is provided with a cross bar 42 at the lower end, this bar being raised to pass through a slot in communication with an opening 43, in the longitudinal base member indicated at 44. This opening has a cross slot and the pin 42 may pass through the cross slot and, when the pin 41 is turned, will prevent the return of the pin and prevent dislodging the rack from the base member 44. Pin 25 is made to engage a strap 45 to secure to the bar 22 and serves to hold the bars in close relationship. At the same time, the latch may readily be released should it be desired to pivot the bars with respect to one another. The bar 41 as shown in FIG. 11 is provided with a cold rolled pin 42 as indicated and also a hole 46 for receiving a cotter pin 47 to hold the spring idnicated at 48 in its desired condition of compression. FIG. 10 illustrates the arrangement of the latches 49 which retain or lock the gates 24 to the bar 27, two latches, one on each gate being employed for this purpose. These are the latches which are released when it is desired to move the gates from the closed position. Latches 49 pressed by springs 50, engage a retainer 51 on the bar 27 and prevent separation of the bars or members 21 and 22 during the normal use of the gates by the swinging of the gates about the pivots at the corners of the rack.

The bars for the rack are, by way of example, square iron tubing, the rack assembly is held together by bolts as are various parts including the gussets 14 and 15 . The entire assembly may be taken apart and packed in a relatively small package for shipment and may readily be assembled and mounted on a pickup truck.

Various modifications of the structural features disclosed will occur to those skilled in the art and it is desired by the appended claims to cover all modifications which fall within the spirit and scope of the invention.

I claim:

1. A livestock enclosure for the body of a pickup truck or the like comprising two foldable rack structures, one for each side of the truck body, each of said rack structures comprising a plurality of sections hinged successively to one another, means providing an upright head structure contructed and arranged for extending upwardly adjacent the front end of a truck body and including elongated base supports one on each side and ridigly secured to said head structure and constructed and arranged to fit on and be secured to the respective rearwardly extending walls of the truck body, the forward edge of the first section of each respective rack structure being hinged to said head structure along a respective vertical axis for swinging movement and said two rack structures being foldable in accordion manner against said head structure, and means for retaining each rack structure in engagement with the respective one of said base supports and for locking said rack structures to said base supports, the rearmost section of each rack structure constituting the rear gate of the enclosure on its respective side, said enclosure further including means affording compound movement of each of said gates laterally outwardly from the side of its respective rack structure, whereby said gates may be opened by their lateral movement when the normal opening of the gates is prevented by the nearness of a loading chute wall or other obstruction.

2. A livestock enclosure for the body of a pickup truck or the like comprising two foldable rack structures comprising a plurality of sections hinged successively to one another, means providing an upright head structure constructed and arranged for extending upwardly adjacent the front end of a truck body and including elongated base supports one on each side and rigidly secured to said head structure and constructed and arranged to fit on and be secured to the respective rearwardly extending walls of the truck body, the forward edge of the first section of each respective rack structure being hinged to said head structure along a respective vertical axis for swinging movement and said two rack structures being foldable in accordion manner against said head structure, and means for retaining each rack structure in engagement with the respective one of said base supports and for locking said rack structures to said base supports, the rearmost section of each rack structure constituting the rear gate of the enclosure on its respective side, said enclosure further including means affording movement of each of said gates laterally outwardly from the side of its respective rack structure, whereby said gates may be opened by their lateral movement when the normal opening of the gates is prevented by the nearness of a loading chute wall or other obstruction, said enclosure further including a locking bar for holding the folded rack in position against said head structure, and means for using said bar for holding said gates in their closed position.

3. A livestock enclosure for the body of a pickup truck or the like comprising two foldable rack structure, one for each side of the truck body, each of said rack structures comprising a plurality of sections hinged successively to one another, means providing an upright head structure constructed and arranged for extending upwardly adjacent the front end of a truck body and including elongated base supports one on each side and rigidly secured to said head structure and constructed and arranged to fit on and be secured to the respective rearwardly extending walls of the truck body, the forward edge of the first section of each respective body, the forward edge of the first section of each respective rack structure being hinged to said head structure along a respective vertical axis for swinging movement and said two rack structures being foldable in accordion manner against said head structure, and means for retaining each rack structure in engagement with the respective one of said base supports and for locking said rack structures to said base supports, the rearmost section of each rack structure constituting the rear gate of the enclosure on its respective side, said enclosure further including means affording movement of each of said gates laterally outwardly from the side of its respective rack structure, whereby said gates may be opened by their lateral movement when the normal opening of the gates is prevented by the nearness of a loading chute wall or other obstruction, said movement affording means comprising an elongated support member hinged to the respective rear gate at one end and to an adjacent section at its other end, means for locking said member in general alignment with said adjacent section in the normal hinged position of said gate, said gate upon unlocking of said member being free for movement laterally of said rack structure.

\* \* \* \* \*